United States Patent
Wagner

(10) Patent No.: US 10,511,785 B2
(45) Date of Patent: Dec. 17, 2019

(54) TEMPORALLY ALIGNED EXPOSURE BRACKETING FOR HIGH DYNAMIC RANGE IMAGING

(71) Applicant: Paul A Wagner, Vancouver, WA (US)

(72) Inventor: Paul A Wagner, Vancouver, WA (US)

(*) Notice: Subject to any disclaimer, the term of this patent is extended or adjusted under 35 U.S.C. 154(b) by 549 days.

(21) Appl. No.: 14/514,077

(22) Filed: Oct. 14, 2014

(65) Prior Publication Data

US 2015/0029361 A1    Jan. 29, 2015

Related U.S. Application Data

(63) Continuation of application No. 12/717,765, filed on Mar. 4, 2010, now abandoned.

(60) Provisional application No. 61/157,494, filed on Mar. 4, 2009.

(51) Int. Cl.
*H04N 5/235* (2006.01)
*H04N 5/225* (2006.01)

(52) U.S. Cl.
CPC ......... *H04N 5/2355* (2013.01); *H04N 5/2254* (2013.01); *H04N 5/235* (2013.01); *H04N 5/2356* (2013.01)

(58) Field of Classification Search
CPC .................................................... H04N 5/2356
See application file for complete search history.

(56) References Cited

U.S. PATENT DOCUMENTS

| 4,672,196 | A | * | 6/1987 | Canino | G01B 11/065 |
| | | | | | 250/225 |
| 5,315,384 | A | * | 5/1994 | Heffington | H04N 9/097 |
| | | | | | 348/340 |
| 2004/0130649 | A1 | * | 7/2004 | Lee | H04N 5/23212 |
| | | | | | 348/345 |
| 2008/0291289 | A1 | * | 11/2008 | Kurane | H04N 5/235 |
| | | | | | 348/222.1 |
| 2010/0328780 | A1 | * | 12/2010 | Tocci | G02B 5/04 |
| | | | | | 359/636 |

FOREIGN PATENT DOCUMENTS

JP     11098418 A  *  4/1999

OTHER PUBLICATIONS

Aggarwal, Manoj and Ahuja, Narendra; "Split Aperture Imaging for High Dynamic Range"; 2001; International Conference on Computer Vision; vol. 2, pp. 10-17 (Year: 2001).*

* cited by examiner

*Primary Examiner* — Gary C Vieaux
(74) *Attorney, Agent, or Firm* — Mark E. Beatty; Rylander & Associates PC

(57) ABSTRACT

Apparatus and methods are provided to create high dynamic range images by passing an incoming image through a color-neutral separation prism having at least three channels to produce a corresponding number of full color fractionated images, each channel aligned with a corresponding image capturing device for which an ISO sensitivity is selected to simultaneously achieve a different exposure value for each fractionated image and image capturing device, referred to as exposure bracketing, and recombining the simultaneously collected fractionated images to create a high dynamic range image. The apparatus and methods may be used for still photography or motion pictures.

13 Claims, 6 Drawing Sheets

TEMPORALLY ALIGNED EXPOSURE BRACKETING FOR HIGH DYNAMIC RANGE IMAGING

CROSS-REFERENCE TO RELATED APPLICATION

This application is a continuation of and claims priority to co-pending application Ser. No. 12/717,765, filed Mar. 4, 2010, and which is herein incorporated by reference in its entirety. This application claims the benefit of U.S. Provisional Patent Application No. 61/157,494, filed Mar. 4, 2009, the complete disclosure of which is incorporated herein, in the entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent files and records, but otherwise reserves all other copyright rights.

FIELD OF THE INVENTION

This invention relates generally to imaging systems, and more particularly, to imaging systems that provide varying exposures for production of high dynamic range images.

BACKGROUND

High dynamic range imaging (HDRI) is a term applied in image processing, computer graphics and photography, and generally relates to systems or techniques for providing a greater dynamic range of exposures. HDRI is most commonly employed in situations where the range between light and dark areas is great, and subsequently a normal exposure, or even a digitally enhanced exposure, are not adequate to resolve all of the image area.

HDRI manipulates images and exposures to accurately represent the wide range of intensity levels found in real scenes, from direct sunlight to shadows. With HDRI, the user employs multiple exposures and bracketing with photo merging, to get greater detail throughout the tonal range.

More particularly, HDRI processing involves merging several exposures of a given scene into a, typically, 32-bit HDRI source file, which is then "tone mapped" to produce an image in which adjustments of qualities of light and contrast are applied locally to the HDRI source image.

HDRI images are best captured originally in a digital format with a much higher bit depth than the current generation of digital imaging devices. Current devices are built around an 8-bit per channel architecture. That means that both the cameras and output displays have a maximum tonal range of 8-bits per RGB color channel.

HDRI formats are typically 32-bits per channel. A few next generation cameras and displays are capable of handling this kind of imagery natively. It will probably be quite a few years until HDRI displays become common but HDRI cameras and acquisition techniques are already emerging.

HDRI images are typically tone-mapped back to 8-bits per channel, essentially compressing the extended information into the smaller dynamic range. This is typically done automatically with a variety of existing software algorithms, or manually with artistic input through programs like Adobe Photoshop.

So in a typical workflow for HDRI the artist first captures the HDRI image, and then the image is tone-mapped back to desired output device such as ink on paper, an 8-bit RGB monitor, or even a 32-bit HDRI monitor (requiring no tone mapping).

The real challenge with HDRI is not the file formats or computer algorithms to tone map them to 8-bit displays. Those challenges have already been largely met. For example, open EXR is an example of a robust open source HDRI format developed by Industrial Light and Magic. The hardest part of capturing HDR images is the physical devices used to capture the imagery. So far only two ways of capturing HDR images are available.

The first is to use exotic high end cameras with special imaging chips (CMOS or CCD) like the Spheron HDR. Both CCD (charge-coupled device) and CMOS (complimentary metal-oxide semiconductor) image sensors convert light into electrons, though CMOS sensors are much less expensive to manufacture than CCD sensors. These types of cameras are typically used by professionals in controlled environments for the primary purpose of creating spherical photos to illuminate computer generated images (another important use of HDRI). They are not point and shoot cameras and are not capable of motion photography.

The second is shooting multiple varying exposures in rapid succession (known as exposure bracketing) then combining those images taking the highlights from the underexposed images, mid tones from the normally exposed images, and shadows from the over exposed images to create a composite HDR image that retains massive detail in the highlights and shadows where normal cameras would lose detail.

Both of these techniques have substantial disadvantages. The second technique can be done with conventional hardware, but it is time consuming and takes substantial expertise to pull off. In addition, because the images are not temporally aligned, meaning they were taken one after another at different moments in time, there can be changes in the scene that produce artifacts when the HDRI software attempts to eliminate or synthesize the objects in motion across the frame. An example would be a car moving through the frame.

Even a slight movement of the camera between exposures will be noticeable in the resulting combined image. Moving objects will be "ghosted" in the HDRI image. As such this technique is totally useless for motion photography and can only be used with substantial success in still photography applications.

For this reason, exposure bracketed HDRI is typically restricted to still subjects, and any animals, cars, pedestrians, moving leaves or litter, clouds, etc., in fact anything that is shifting within the frame will preclude HDRI, or at the very least lead to unhappy results.

Further, producing HDRI from multiple images can be a time consuming and frustrating task. HDRI requires multiple, huge files, multiple steps, and typically specialized and complicated software.

The first technique is very expensive and requires exotic hardware or sophisticated electronic and software systems. While imaging chips are moving ever forward in sensitivity and dynamic range, they still do not produce the dramatic results that the first technique of changing exposures does. In addition, these special cameras are not capable of shooting higher frame rates required to shoot motion pictures. These products are used for narrow specialized purposes.

Proposed solutions to the problems associated with the second technique are reflected in various published patents at the United States Patent and Trademark Office. For example, United States Patent Application No. 20060221209, to McGuire, et al., published Oct. 5, 2006, teaches an apparatus and method for acquiring and combining images of a scene with multiple optical characteristics at multiple resolutions. Disclosed therein is a camera system that acquires multiple optical characteristics at multiple resolutions of a scene. The camera system includes multiple optical elements arranged as a tree having a multiple of nodes connected by edges. The system employs filters at the end of the chain, and lenses are placed in front of each of the sensors, creating additional sources of optical distortion.

United States Patent Application No. 20070126918, to Lee, published Jun. 7, 2007, discloses cameras that can provide improved images by combining several shots of a scene taken with different exposure and focus levels is provided. In addition, cameras are provided, which have pixel-wise exposure control means so that high quality images are obtained for a scene with a high level of contrast. The system is complicated, and employs light reducing filters to create exposures of varying intensity. Much of the light is lost, reducing clarity and introducing sources of distortion and noise to the images.

United States Patent Application No. 20080149812, to Ward, et al., published Jun. 26, 2008, discloses an electronic camera comprising two or more image sensor arrays. At least one of the image sensor arrays has a high dynamic range. The camera also comprises a shutter for selectively allowing light to reach the two or more image sensor arrays, readout circuitry for selectively reading out pixel data from the image sensor arrays, and, a controller configured to control the shutter and the readout circuitry. The controller comprises a processor and a memory having computer-readable code embodied therein which, when executed by the processor, causes the controller to open the shutter for an image capture period to allow the two or more image sensor arrays to capture pixel data, and, read out pixel data from the two or more image sensor arrays. This is essentially a total digital solution to the problem of controlling exposure levels for different images for high dynamic range processing.

Finally, United States Patent Application No. 20070177004, to Kolehmainen, et al., published Aug. 2, 2007, is directed to an image creating method and imaging device comprising at least two image capturing apparatus, each apparatus being arranged to produce an image. The apparatus is configured to utilize at least a portion of the images produced with different image capturing apparatus with each other to produce an image with an enhanced image quality. Multiple lenses are required to implement this method, which is expensive and creates parallax and optic imagery distortions with each lens addition.

None of the prior approaches have been able to provide a simple means for capturing multiple images that overcome the difficulties of temporal misalignment, and that are simple and quickly resolved into a high definition range image.

What is needed is an inexpensive solution that can be easily integrated into products with conventional form factors. This solution would ideally be easy to use, compact, and able to shoot at high frame rates with no introduction of temporal alignment problems and associated artifacts.

SUMMARY AND ADVANTAGES

By this invention is provided an optical imaging system for temporally aligning bracketed exposures of a single image, the system comprising a light aperture, a prism and an image capturing device, where the prism is capable of splitting an incoming image from the light aperture into at least two temporally aligned images, and where the image capturing device captures the temporally aligned images at different levels of exposure.

In one embodiment of the invention, the prism splits the intensity of said incoming image to achieve a desired EV output interval between temporally aligned images.

In a different embodiment, the capturing device further comprises image detection sensors, and the ISO of the sensors is adjusted to achieve a desired EV output interval between said images.

In another aspect of the invention, the system comprises an image processing device connected to said image capturing device.

In one embodiment, the image processing device comprises a computer processor.

In a different embodiment, the device further comprises a tone-mapping processor.

In a different aspect, the system comprises an eyepiece for viewing the image to be captured by the lens.

In a still further aspect, the system comprises a digital readout monitor.

In another embodiment, the prism is capable of splitting the image into three or more levels of exposure.

In a different embodiment, the three levels of exposure are about 14%, about 29% and about 57%, respectively, of the exposure level of the original image.

In a different embodiment, the three levels of exposure are about 5%, about 19% and about 76%, respectively, of the exposure level of the original image.

In a different embodiment, the three levels of exposure are about 1%, about 11% and about 88%, respectively, of the exposure level of the original image.

In a still different embodiment, the prism is capable of splitting the image into four or more levels of exposure.

In another embodiment, the prism is capable of splitting the image into five or more levels of exposure.

In a different aspect, the invention provides a method for temporally aligning bracketed exposures of a single image, the method comprising the steps of (a) using a prism to split an incoming image from a light aperture into at least two temporally aligned images, and (b) using an image capturing device to capture the temporally aligned images at different levels of exposure.

The optical imaging system of the present invention provides an improvement to high dynamic range imaging, and assemblies therefore, that allows temporally aligned exposure bracketing. The system is simple, elegant, leverages existing technologies, allows for motion capture with no temporal distortion, and is relatively inexpensive to implement. A significant advantage is that the claimed system achieves true multi-exposure HDR without exposures spread across time, and therefore not subject to distortions introduced by movement between frames. This makes it suitable for motion film applications and action photography, as well as simple point and shoot operation for stills.

Another significant advantage is that the system and method do not lose light—essentially all of the light coming through the aperture reaches the sensors. No ND filters are required to adjust exposure levels, which reduce the amount of light reaching the sensors. The present optical imaging system allows the user to capture light with confidence that the under and over exposed regions in the image will be imaged properly. The user simply captures all the available light with and image capturing device, and determines later how to map that information to the output device. With the optical imaging system the user can create stunning imagery that is otherwise impossible to capture, even with the most sophisticated of the current generation of normal photography equipment.

Another significant advantage of the claimed system and methods is that they can be used to extend the dynamic range of any generation of photo-sensors. Regardless of how advanced the sensors are, the system and methods herein can effectively "extend" their dynamic range by as much as six stops, thereby squeezing extra performance from existing technologies.

These and other features and advantages of this invention are described in, or are apparent from, the following detailed description of various exemplary embodiments of the apparatus and methods according to this invention.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

A more complete understanding of the present invention and the attendant features and advantages thereof may be had by reference to the following detailed description when considered in conjunction with the accompanying drawings wherein.

REFERENCE NUMBERS USED IN DRAWINGS

Figure 1:
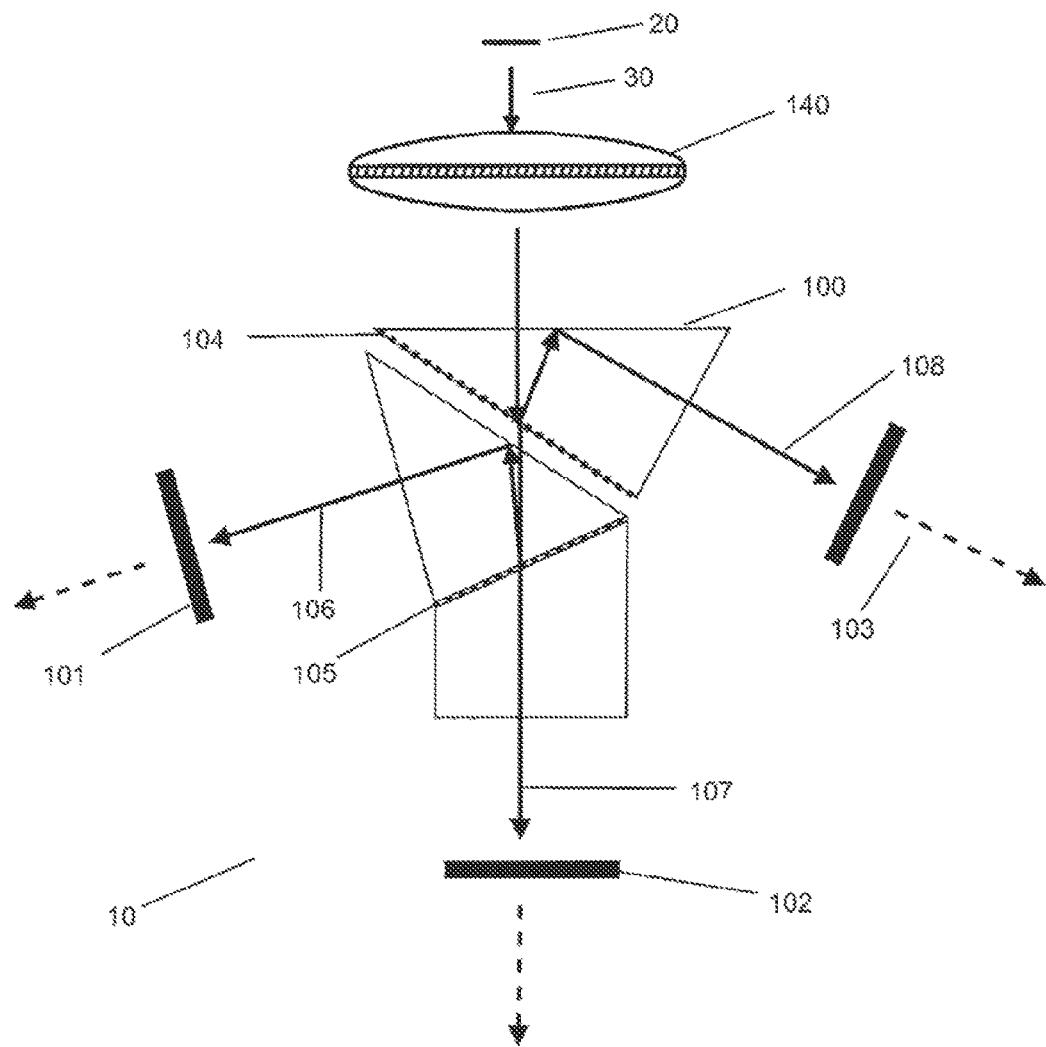
FIG. 1 shows a diagrammatic view of the system produced according to the invention, demonstrating variations to exposure intervals are shown using different combinations of prism splits and sensor sensitivity settings.

Turning now descriptively to the drawings, in which similar reference characters denote similar elements throughout the several views, the figures illustrate the_of the present invention. With regard to the reference numerals used, the following numbering is used throughout the various drawing figures:

| Reference Number | Description |
| --- | --- |
| 10 | An embodiment of an optical imaging system |
| 20 | Aperture |
| 30 | Incoming image |
| 100 | Color-neutral separation prism |
| 101 | Image capturing device |
| 102 | Image capturing device |
| 103 | Image capturing device |
| 104 | Color-neutral internal partially-reflective boundary |
| 105 | Color-neutral internal partially-reflective boundary |
| 106 | Fractionated image |
| 107 | Fractionated image |
| 108 | Fractionated image |
| 110 | Tone mapping processor |
| 120 | HDRI processor |
| 140 | Optical imaging system lens |
| 150 | Eyepiece/monitor |
| 160 | 8-bit tone mapped data |
| 170 | 32-bit HDRI data |
| 330 | Incoming light from an external image |
| 331 | First prism light channel |
| 332 | Second prism light channel |
| 430 | Incoming light from an image |
| 431 | First prism light channel |
| 432 | Second prism light channel |
| 433 | Third prism light channel |
| 530 | Incoming light from an external image |
| 531 | First prism light channel |
| 532 | Second prism light channel |
| 533 | Third prism light channel |
| 534 | Fourth prism light channel |
| 630 | Incoming light from an external image |
| 631 | First prism light channel |
| 632 | Second prism light channel |
| 633 | Third prism light channel |
| 634 | Fourth prism light channel |
| 635 | Fifth prism light channel |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure. Applicant's invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any materials similar or equivalent to those described herein can also be used in the practice or testing of the present invention, the preferred materials are now described.

All publications and patents cited in this specification are herein incorporated by reference as if each individual publication or patent were specifically and individually indicated to be incorporated by reference and are incorporated herein by reference to disclose and describe the materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

As used herein and in the appended claims, the singular forms "a," "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

For example, although the foregoing drawings and references refer to color images and processors, the system and methods work equally well for black and white (grayscale) images and sensors. For instance, some applications for scientific or industrial use may prefer grayscale imagery.

Further, while unusual in present day camera art, it is possible to build an imaging apparatus without a primary lens (i.e., a pinhole camera or a slit scanner). These applications are more likely in industrial or scientific applications. The invention can easily be adapted for designs that don't include a front end lens, but rather a simple aperture or the like.

Generally speaking, the systems and methods utilize prism splitting by full spectrum brackets to several image detecting sensors of an image capturing device. The system eliminates exotic image sensors as a necessary feature. The system allows multiple exposures from existing commodity sensors simultaneously by simply dividing the incoming light for an image into multiple and different levels of exposure for the same image.

The temporally aligned imaging system can be analogized to Technicolor. Before color film stock was developed, Hollywood was in search of a way to shoot films in color. Technicolor, Inc. was the first company to develop a way to create color pictures from black and white film stock. It utilized three rolls of black and white film exposed simultaneously through a special set of beam splitters with red, green, and blue filters on them.

Simply put, each black and white film negative recorded just the red, green, or blue information. This process was done in reverse with a projector that ran all three rolls of film simultaneously with the correct color filter in front of each. When the images are aligned properly, a full color picture is realized.

As better color film stocks emerged, this process fell out of favor, until video cameras emerged. In the early days of video, color sensors were not very sharp, and had difficulty producing high resolution images, or good color saturation and reproduction. Black and white sensors were far sharper and had a higher dynamic range. So the Technicolor principle of using three image sensors and a beam splitter to feed each an identical simultaneous image was dusted off and put into use for a new generation of imaging products. Three black and white CCD were used with a new and vastly improved beam splitter called a trichroic prism.

This technique is used to this day in professional level video cameras, sometimes referred to as 3CCD sensor. The three red, green and blue sensors not only allow for sharper more saturated colors but also help enhance the dynamic range of the images they help create. But just as better color film stocks helped to usher out the era of the Technicolor process, better CMOS and CCD sensors are ushering out the era of 3CCD sensor systems in favor of full color single sensor systems. In fact some of the highest end professional cameras like the lineup from RED Digital Cinema Camera Company as well as every professional Digital SLR use only one full color sensor. It is quite apparent that sensor technology has progressed to the point where a single color sensor can replace and even outperform 3CCD sensor systems.

In one aspect, the temporally aligned exposure bracketing system employs trichroic prisms adapted to split the entire spectrum to each of multiple full color sensors, at different exposure levels, rather than splitting out the spectrum into different colors.

The system allows a color neutral change in the amount, rather than the spectrum, of light going to each sensor, by the application of such prisms for the temporal alignment of images for HRDI. By "color neutral", it is meant that while the temporally aligned images created by the prism may vary in intensity between themselves, or between themselves and the incoming image, they are not substantially different from one another in color spectrum, i.e., the prism creates split images that are similar in color spectrum, or spectrally neutral, even if differing substantially in intensity.

All of the commonly understood color separation prism layouts may also be used for neutral separation. In reference now to FIG. 1, the system 10 comprises an optical imaging system having an aperture 20 for capturing incoming light 30. Internal to the system is a neutral prism 100 that is used to reflect the captured light to generate a color-neutral separation.

In FIG. 1, the neutral film prism 100 is depicted as a three-way prism that splits the light to three separate full color image capturing devices 101, 102 and 103. Various means can be employed to adjust the EV (Exposure Value, commonly referred to as a "stop") up and down with the intensity spectrum, and a camera can then capture the images simultaneously. In FIG. 1, two consecutive neutral films are used to create color-neutral internal partially-reflective boundaries 104 and 105 are used, respectively capturing 57.1429% (4/7) of the light followed by a neutral film of 33.33% (1/3) for the remainder light. The neutral prism thus fractionates a captured image into three temporally aligned exposures 106, 107 and 108, that have relative light intensities of 1/7, 2/7 and 4/7 of the incoming light.

The film coatings 104 and 105 for the prism 100 may be of any of numerous coatings known to the art and capable of achieving a color neutral split, or separation, of the image, by reflection of the incoming image light 30. Two examples of such spectrally neutral films include a thin film metallic coating, typically aluminum or silver, with or without a set of dielectric layers, and a set of dielectric layers consisting of high and low refractive index materials with the thin film stack designed to reflect a certain percentage of the incident light over the visible wavelength range. These and related types of thin film coatings 104 and 105 shall be termed "spectrally neutral film" or, alternatively, "neutral film."

Table 1 provides a demonstration for calculating the percentages for such a system, using a prism for splitting a captured image into temporally aligned exposures 106, 107 and 108 at levels of 14.2857%, 28.5714% and 57.1429%, respectively.

TABLE 1

| sensor | percent light | ratio |
|---|---|---|
| +1 EV | 14.2857% | 1/7 |
| standard EV | 28.5714% | 2/7 |
| −1 EV | 57.1429% | 4/7 |
| neutral film percent | | neutral film ratio |
| 57.1429% | | 4/7 |
| 33.3333% | | 1/3 |

Thus, with color image sensors that do not need the RGB color split, the prism is harnessed for the purpose of splitting out different exposures of the same image, that are temporally aligned (taken at the same moment).

Various means can be employed to adjust the EV (Exposure Value, commonly referred to as a "stop") up and down with the intensity spectrum that would allow a camera to capture the images simultaneously. For instance, this can be accomplished by splitting the incoming light into different intensities directly in the prism, adjusting the ISO sensitivity in the sensors or some combination of the two.

At one extreme, the system could split the light intensity in the prism 100 into equal amounts of roughly 33% each and then adjust the ISO of the sensors 101, 102 and 103 respectively to achieve different EV output intervals. At another extreme, the system could split the light intensity within the prism 100 into the desired EV intervals for the light 106, 107 and 108. Thus, even while leaving the ISO of the sensors the same, the desired different EV output intervals are achieved for the recorded images. Any combination between these two extremes may be more or less desirable for various applications.

Figure 2:
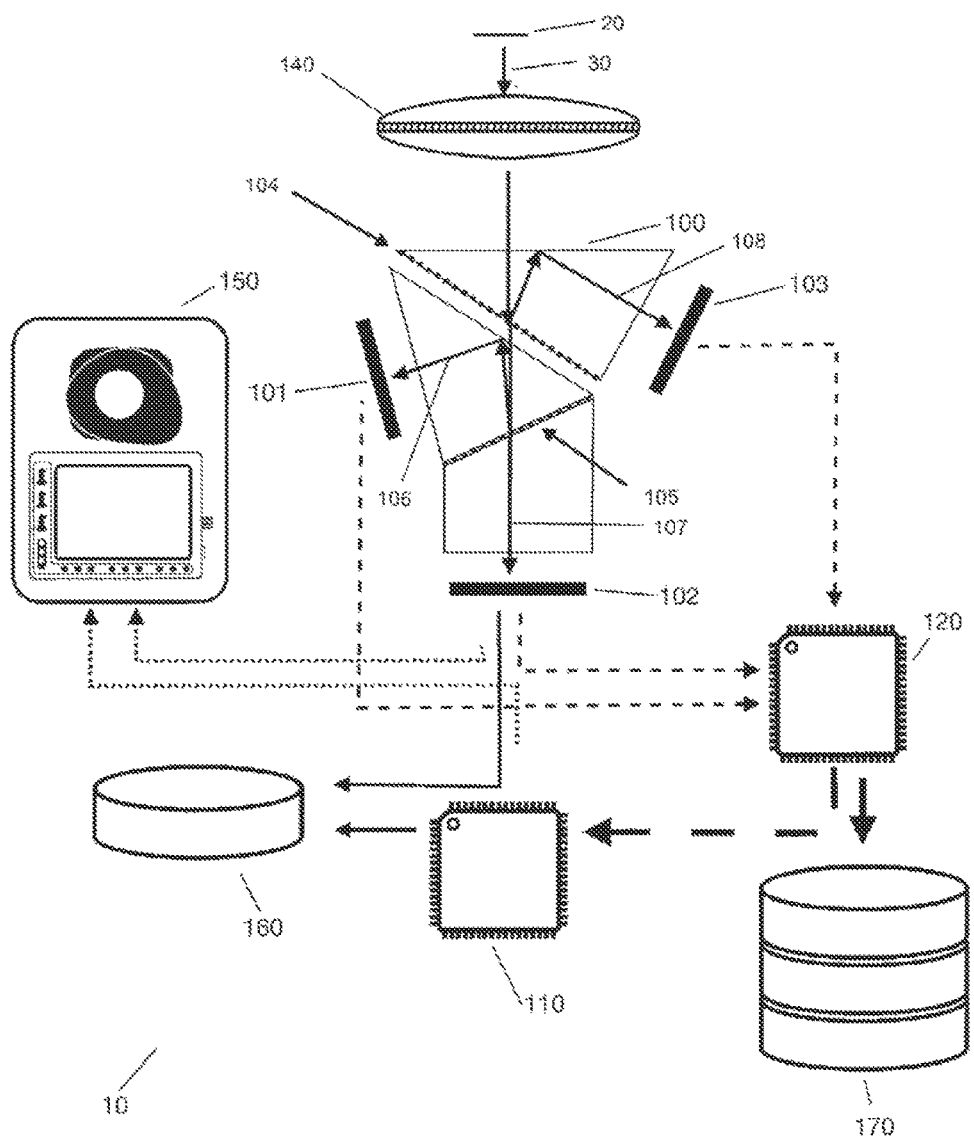
FIG. 2 shows a diagrammatic view of a system of FIG. 1 and further showing additional components of the system for processing the images.
Figure 3:
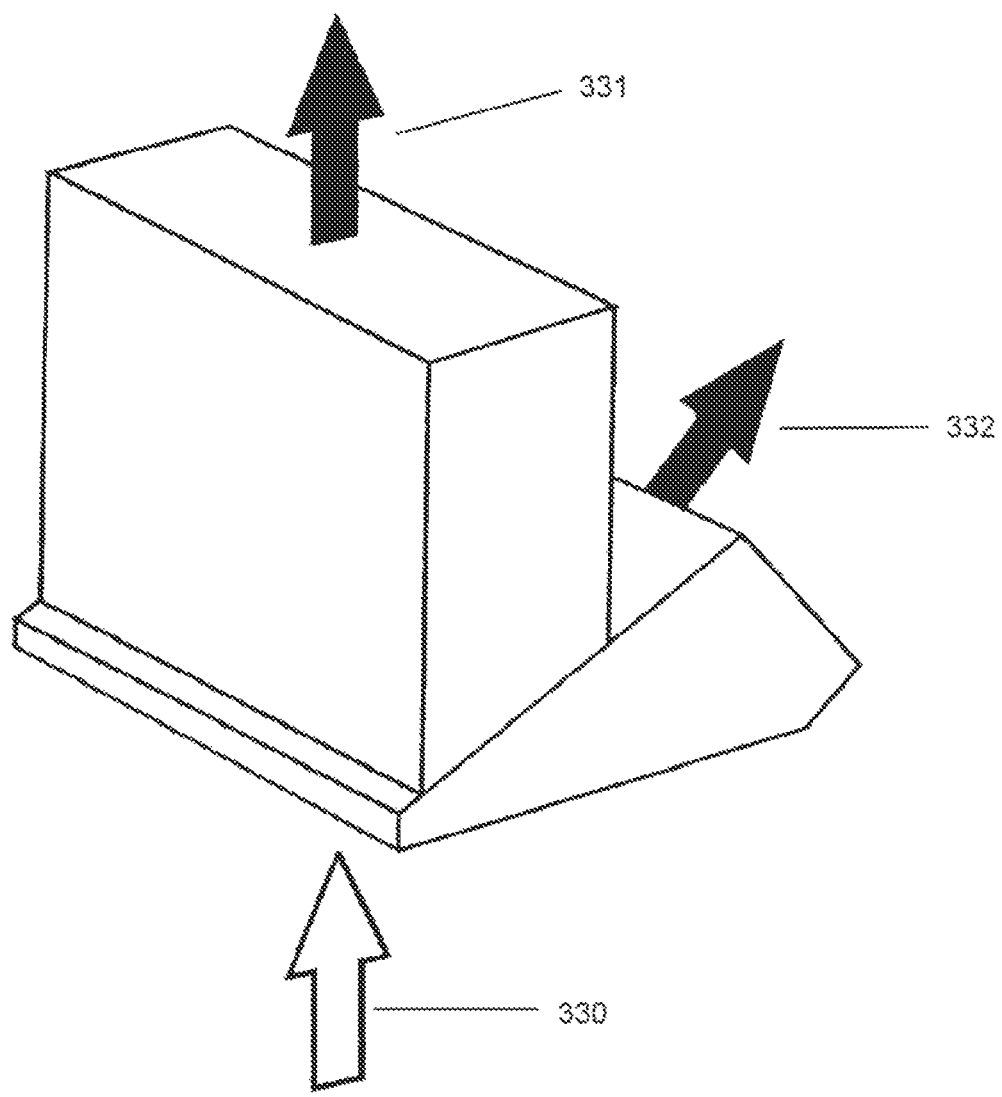
FIG. 3 shows a perspective drawing of a two-way prism that could be utilized with the invention.
Figure 4:
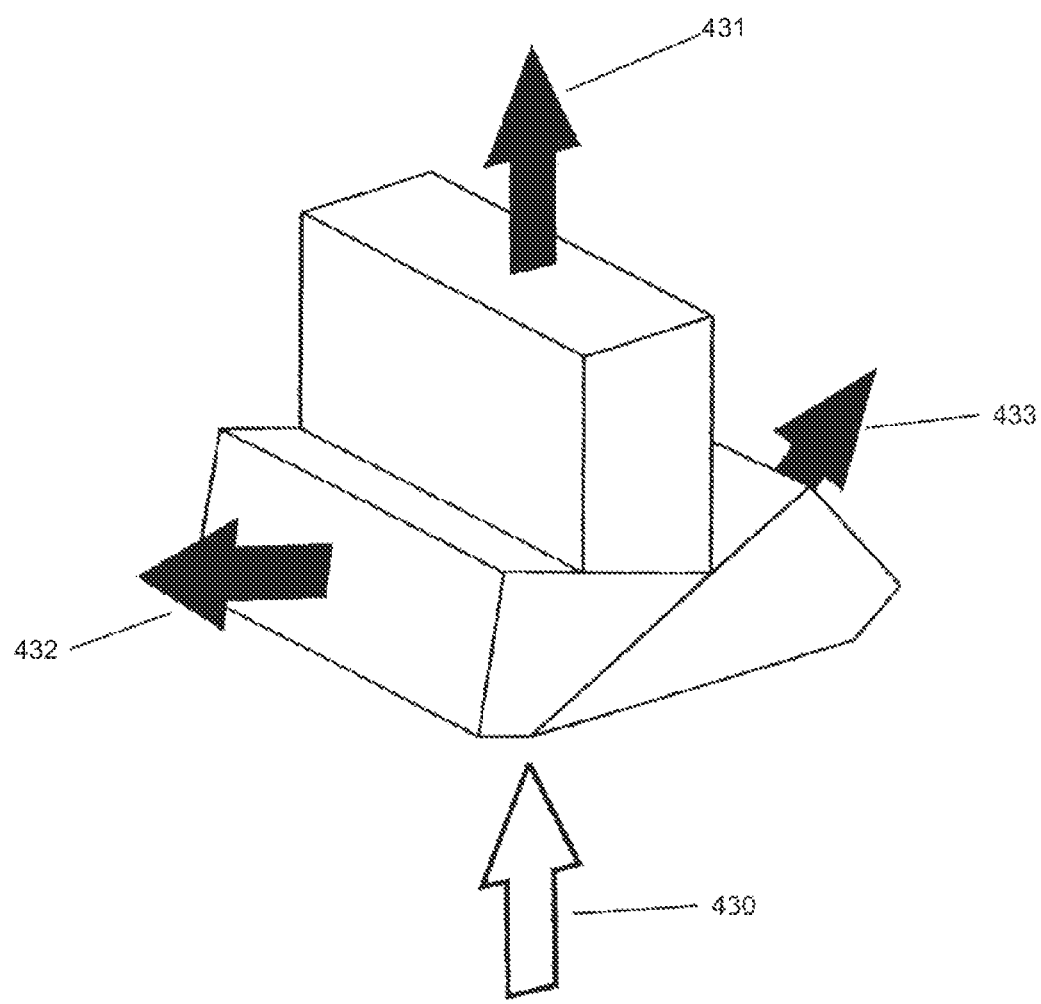
FIG. 4 shows a perspective drawing of a three-way prism that could be utilized with the invention.

FIG. 2 illustrates some additional components of a system 10. In FIG. 2 is seen the deployment of a tone mapping processor 110 and an HDRI processor 120 that are used for combining the images. The processing chip is used to combine the three images in real time to an HDRI image, and another chip is used to complete the tone mapping. These functions can also be combined into a single processing chip.

Systems for controlling the action of the lens and associated hardware, including light responsive software controllers, are well known to the art.

In addition, the individual sensors could benefit from some tuning for their respective exposure levels to reduce noise and other artifacts associated with under and over exposure, in ways known to the art.

A high quality standard camera lens 140 can be used with the system 10 to gather and focus light from the light aperture.

The system 10 also will typically include an eyepiece and/or monitor 150 for aligning the images for capture from the lens onto the sensors.

Additional features of the system typically would include mass storage for either the 8-bit tone mapped data 160, or the raw 32-bit HDRI data 170. Other HDRI formats are known, for instance 16-bit and 14-bit formats, though the standard is evolving toward the higher 32-bit format.

The ISO is a function of how sensitive the sensor/film is to light. The exposure generated by a particular aperture, shutter speed, and sensitivity combination can be represented by its exposure value "EV". Zero EV is defined by the combination of an aperture of f/1 and a shutter speed of 1 s at ISO 100.

The term "exposure value" is used to represent shutter speed and aperture combinations only. An exposure value which takes into account the ISO sensitivity is called "Light Value" or LV and represents the luminance of the scene. For the sake of simplicity, as is the case in this patent, Light Value is often referred to as "exposure value", grouping aperture, shutter speed and sensitivity in one familiar variable. This is because in a digital camera it is as easy to change sensitivity as it is to change aperture and shutter speed.

Each time the amount of light collected by the sensor is halved (e.g., by doubling shutter speed or by halving the aperture), the EV will increase by 1. For instance, 6 EV represents half the amount of light as 5 EV.

Table 2 shows the additional variations possible for adjusting output intervals on top of the prismatic split, for +/−3 EV, +/−2 EV and +/−1 EV.

TABLE 2

| output interval | sensor 1 (+1 EV in) | sensor 2 (standard EV in) | sensor 3 (−1 EV in) |
|---|---|---|---|
| +/−3 EV | 25 ISO | 100 ISO | 400 ISO |
| +/−2 EV | 50 ISO | 100 ISO | 200 ISO |
| +/−1 EV | 100 ISO | 100 ISO | 100 ISO |

The various exposure intervals can be modified or enhanced by using different combinations of prism splits with sensor sensitivity settings. This is accomplished by using differential exposure values (EV) to amplify the differences created by the prismatic split at the level of the sensors.

Table 3 shows results for a diagrammatic view of a system produced according to the invention that as shown in FIGS. 1 and 2, only deploying a prism with two splits of light 104 and 105 corresponding to 76.1905% (16/21) followed by 20.00% (1/5) on the remainder light. This is used for splitting a captured image into temporally aligned exposures 106, 107 and 108 of levels of 76.1905%, 19.0476% and 4.7619%, respectively.

TABLE 3

| sensor | percent light | ratio |
|---|---|---|
| +2 EV | 4.7619% | 1/21 |
| standard EV | 19.476% | 4/21 |
| −2 EV | 76.1905% | 16/21 |
| neutral film percent | | neutral film ratio |
| 76.1905% | | 16/21 |
| 20.0000% | | 1/5 |

Table 4 shows the results where variations to exposure intervals are shown using different combinations of prism splits and sensor sensitivity settings of +/−3 EV, +/−2 EV and +/−1 EV. Table 4 shows the various ISO settings for each sensor that is used to produce alternative EV output intervals from each sensor (these settings are for +/−1 EV input values only) as found in Table 3 (these settings are for +/−2 EV input values only).

TABLE 4

| output interval | sensor 1 (+2 EV in) | sensor 2 (Standard EV in) | sensor 3 (−2 EV in) |
|---|---|---|---|
| +/−3 EV | 50 ISO | 100 ISO | 200 ISO |
| +/−2 EV | 100 ISO | 100 ISO | 100 ISO |
| +/−1 EV | 200 ISO | 100 ISO | 50 ISO |

Table 5 is the results for a system produced according to the invention as depicted in FIGS. 1 and 2, only showing a prism with two splits of light 104 and 105 corresponding to 87.6712% (64/73) followed by 11.11% (1/9) on the remainder light. This is used for splitting a captured image into temporally aligned exposures 106, 107 and 108 of levels of 87.6712%, 10.9589% and 1.3699%, respectively.

TABLE 5

| sensor | percent light | ratio |
|---|---|---|
| +3 EV | 1.3699% | 1/73 |
| standard EV | 10.9589% | 8/73 |
| −3 EV | 87.6712% | 64/73 |

| neutral film percent | neutral film ratio |
|---|---|
| 87.6712% | 64/73 |
| 11.1111% | 1/9 |

Table 6 is the settings for a system as would be configured for the Table 5 percentages, where variations to exposure intervals are shown using different combinations of prism splits and sensor sensitivity settings of +/−3 EV, +/−2 EV and +/−1 EV.

TABLE 6

| output interval | sensor 1 (+3 EV in) | sensor 2 (standard EV in) | sensor 3 (−3 EV in) |
|---|---|---|---|
| +/−3 EV | 100 ISO | 100 ISO | 100 ISO |
| +/−2 EV | 200 ISO | 100 ISO | 50 ISO |
| +/−1 EV | 400 ISO | 100 ISO | 25 ISO |

The system depicted in FIGS. 1 and 2, and through Tables 1 through 6, exemplifies a wide range of exposure levels that can be achieved, but are not exhaustive by any means. These are intended as examples only, and even more possibilities exist, including narrower or greater exposure ranges and configurations and settings of the prism splits with sensor sensitivity settings. However, presently available tone mapping software cannot effectively process divergences in exposure values beyond approximately +/−3 stops. Beyond this, the tone mapping software creates substantial undesired halo effects. Therefore, at present, although the described system and methods can achieve much greater exposure value divergence, a divergence range up to approximately +/−3 stops is currently the limit of optimal performance. Future improvements in tone mapping software and methods may provide greater ability to exploit the full capability of the inventor's system and method.

Further, while the use of a three-way prism is demonstrated in FIGS. 1 and 2, other neutral prism configurations could be utilized. FIGS. 3 through 6 demonstrate configurations for two-way, three-way, four-way and five-way neutral prism configurations, respectively.

Use of different prism splits will be desirable for different applications. In a very minimal configuration a 2-way configuration could work (FIG. 3), although not as well for some applications. However, a two-way neutral prism likely represents the least expensive implementation of the device, and may likely be used in consumer versions of many products produced for the cost savings.

Figure 5:
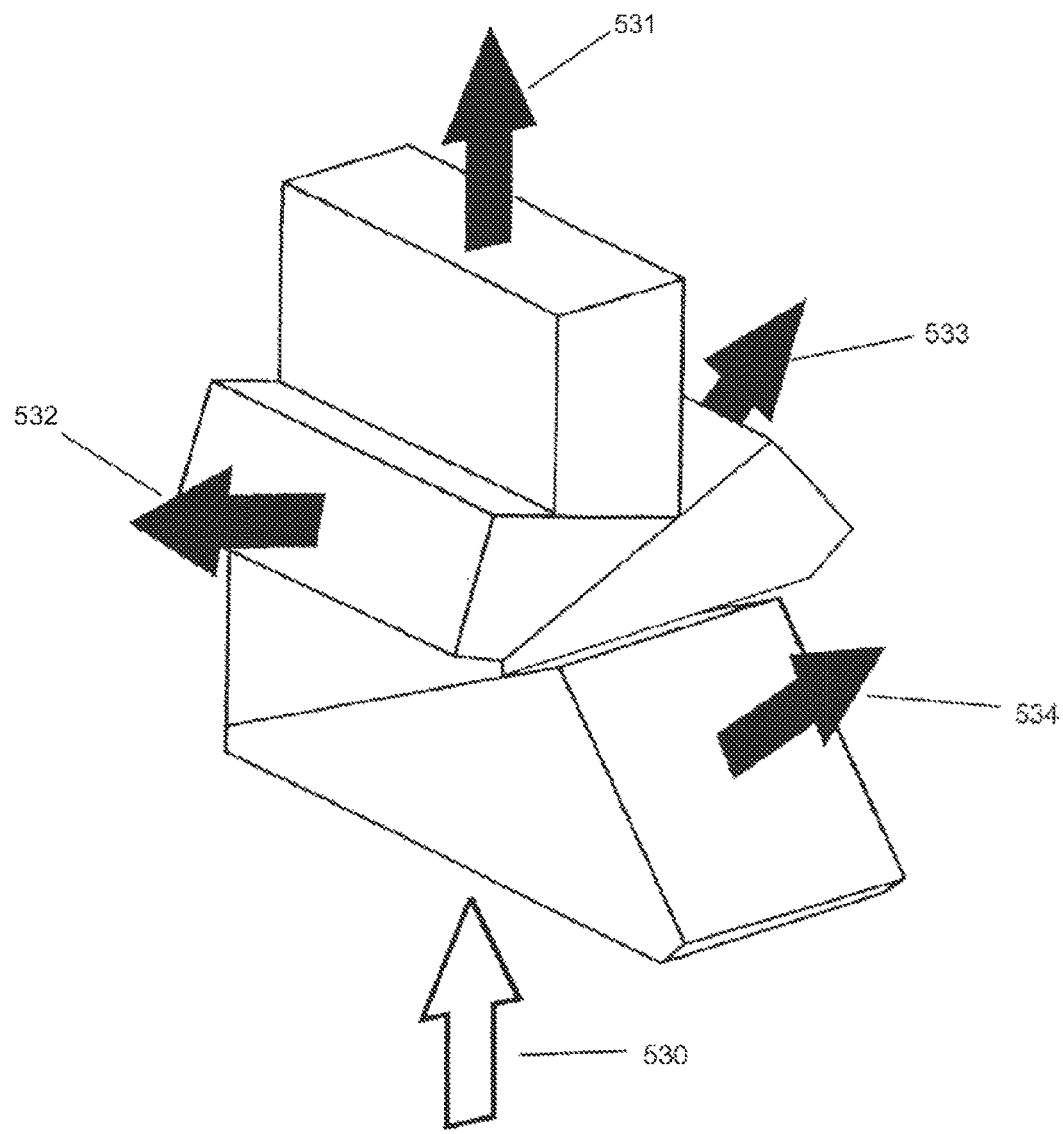
FIG. 5 shows a perspective drawing of a four-way prism that could be utilized with the invention.
Figure 6:
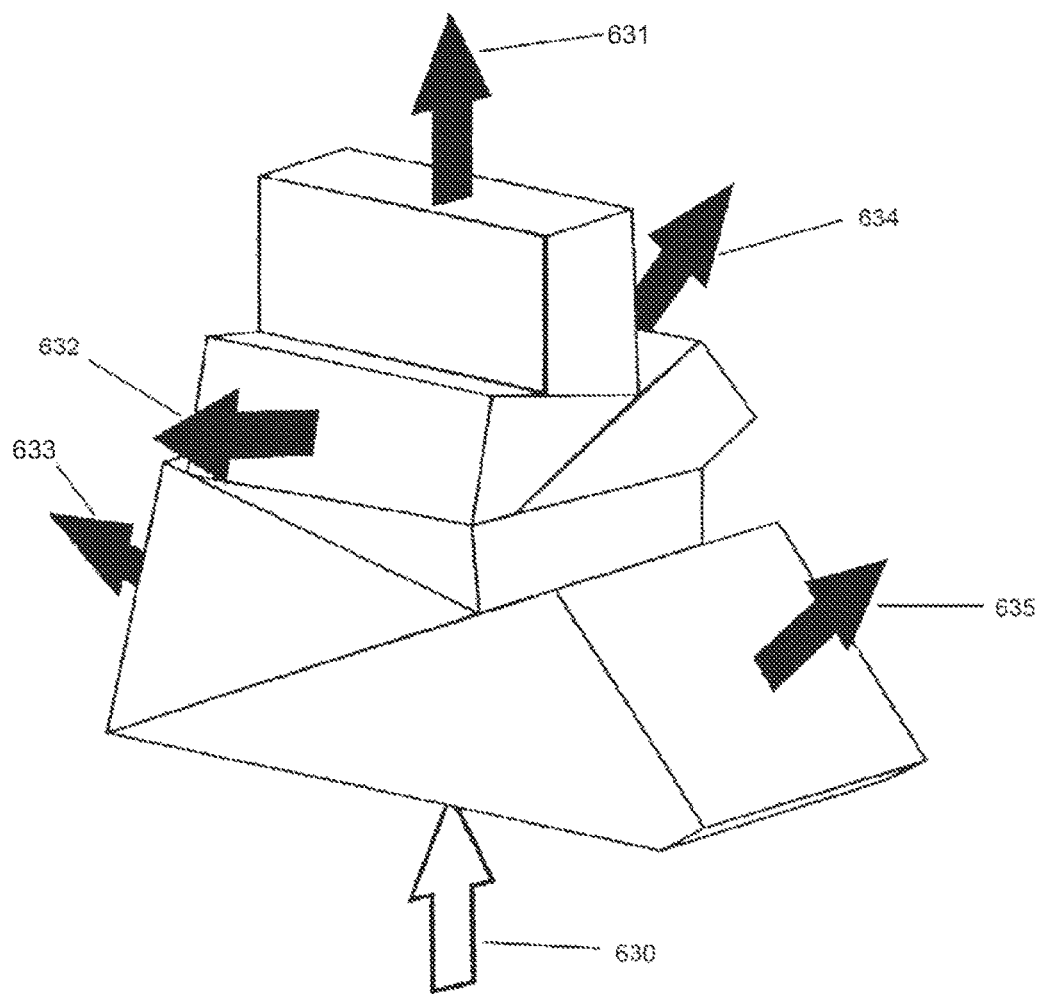
FIG. 6 shows a perspective drawing of a five-way prism that could be utilized with the invention.

On the other hand, in some scientific or professional applications, the greater control from more elaborate splits possible from the four-way and five-way neutral prism splits shown in FIGS. 5 and 6 may be desired.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An optical imaging system comprising:
   a light aperture to receive incoming light from an external image;
   a color-neutral separation prism having at least three full color light channels generated by one or more color-neutral internal partially-reflective boundaries, each of the internal partially-reflective boundaries adapted to reflect a respective selected fraction of the incoming light, the selected fractions of light corresponding to a desired range of exposure values, the prism oriented to receive the incoming light along a first axis and pass a first fraction of the incoming light out a first light channel aligned with the first axis;
   a plurality of image capturing devices corresponding o the at least three light channels, each of the image capturing devices positioned to receive the selected fraction of the incoming light from its corresponding light channel, including a first image capturing device corresponding to the first light channel and first fraction of incoming light;
   wherein the ISO sensitivity of each image capturing device is selected in combination with the respective light fraction to achieve the respective exposure value range, including at least a standard exposure value corresponding to the first light channel and first image capturing device, a second exposure value greater than the standard exposure value and corresponding to a second light channel and second image capturing device, and a third exposure value lesser than the standard exposure value and corresponding to a third light channel and third image capturing device, thereby creating at least three temporally aligned bracketed exposures of an image.

2. The system of claim 1, further comprising an image processor in electronic communication with at least the plurality of image capturing devices to receive the bracketed exposures and combine them into a high dynamic range image.

3. The system of claim 1 wherein each of said image capturing devices further comprises an image detection sensor for said temporally aligned images.

4. The system of claim 2, further comprising a tone-mapping processor in electronic communication with either or both of the image processor and image capturing devices.

5. The system of claim 1 wherein said three levels of exposure are about 14%, about 29% and about 57%, respectively, of the intensity of said incoming image.

6. The system of claim 1 wherein said three levels of exposure are about 5%, about 19% and about 76%, respectively, of the intensity of said incoming image.

7. The system of claim 1 wherein said three levels of exposure are about 1%, about 11% and about 88%, respectively, of the intensity of said incoming image.

8. A method for creating a high dynamic range image, the method comprising
receiving light from an incoming image through an aperture;
passing the received light through a color-neutral separation prism having at least three channels to create a corresponding number of full-spectrum fractionated images, each fractionated image comprising a preselected full color fraction of the received light, wherein the respective fractions of light correspond to a desired exposure value range;
directing each of the full color fractionated images from the at least three channels to a corresponding image capturing device;
selecting an ISO sensitivity for each image capturing device corresponding to its full color fractionated image to provide a different selected exposure value for each image capturing device corresponding to the desired exposure value range;
causing the image capturing devices to simultaneously record their respective full color fractionated images at their corresponding selected exposure values;
passing the simultaneously recorded full color fractionated images to an image processor, wherein the image processor combines the at least three fractionated images having different exposure values into a single high dynamic range image of the incoming image.

9. The method of claim 8, further comprising the step of tone mapping the high dynamic range image to an output media.

10. The method of claim 9, wherein the recorded images are video images.

11. The method of claim 9 wherein the prism has three channels and the corresponding fractionated images are approximately 14%, 29% and 57%, respectively, of the light of the incoming image.

12. The method of claim 9 wherein the prism has three channels and the corresponding fractionated images are approximately 5%, 19% and 76%, respectively, of the light of the incoming image.

13. The method of claim 9 wherein the prism has three channels and the corresponding fractionated images are approximately 1%, 11% and 88%, respectively, of the light of the incoming image.

* * * * *